United States Patent

Brown

(10) Patent No.: US 9,441,102 B2
(45) Date of Patent: Sep. 13, 2016

(54) OPACIFYING PIGMENT PARTICLE

(75) Inventor: Ward Thomas Brown, North Wales, PA (US)

(73) Assignee: Rohm and Haas Company, Philadelphia, PA (US)

( * ) Notice: Subject to any disclaimer, the term of this patent is extended or adjusted under 35 U.S.C. 154(b) by 153 days.

(21) Appl. No.: 12/583,358

(22) Filed: Aug. 19, 2009

(65) Prior Publication Data

US 2010/0056668 A1    Mar. 4, 2010

Related U.S. Application Data

(60) Provisional application No. 61/190,961, filed on Sep. 4, 2008.

(51) Int. Cl.
| | |
|---|---|
| C09D 5/00 | (2006.01) |
| C08L 51/00 | (2006.01) |
| C08F 275/00 | (2006.01) |
| C08F 289/00 | (2006.01) |
| C08F 292/00 | (2006.01) |
| C08L 51/08 | (2006.01) |
| C08L 53/00 | (2006.01) |
| C09D 151/00 | (2006.01) |
| C09D 151/08 | (2006.01) |
| C09D 153/00 | (2006.01) |

(52) U.S. Cl.
CPC ........... *C08L 51/003* (2013.01); *C08F 275/00* (2013.01); *C08F 289/00* (2013.01); *C08F 292/00* (2013.01); *C08L 51/08* (2013.01); *C08L 53/00* (2013.01); *C09D 151/003* (2013.01); *C09D 151/08* (2013.01); *C09D 153/00* (2013.01)

(58) Field of Classification Search
CPC ........... A61K 51/1244; A61K 6/0061; A61K 6/0094; C08L 33/08; C08L 33/10; C08L 37/00; C08F 2/18; C08F 2/20; C08F 2/22; C09D 153/00; C09D 5/028; C09D 5/14; B82Y 30/00; B82Y 20/00
USPC ............ 523/200, 212, 172; 427/213.34; 428/141, 142, 143, 144; 359/536, 539, 359/541; 524/502, 588, 599, 606
See application file for complete search history.

(56) References Cited

U.S. PATENT DOCUMENTS

| | | | |
|---|---|---|---|
| 4,421,660 | A | 12/1983 | Solc nee Hajna |
| 4,609,608 | A | 9/1986 | Solc |
| 4,680,200 | A | 7/1987 | Solc |
| 4,771,086 | A | 9/1988 | Martin |
| 5,171,772 | A | 12/1992 | Hoy et al. |
| 5,663,224 | A | 9/1997 | Emmons et al. |
| 6,080,802 | A | 6/2000 | Emmons et al. |
| 6,756,437 | B1 | 6/2004 | Xue et al. |
| 6,833,401 | B1 | 12/2004 | Xue et al. |
| 6,890,983 | B2 * | 5/2005 | Rosano et al. ............... 524/401 |
| 2005/0118822 | A1 | 6/2005 | Wang et al. |
| 2006/0009546 | A1 * | 1/2006 | Brown ........................ 523/212 |

FOREIGN PATENT DOCUMENTS

| | | |
|---|---|---|
| EP | 1 284 127 A | 2/2003 |
| JP | 58 029804 A | 2/1983 |
| WO | WO 2007/042438 | 4/2007 |

* cited by examiner

*Primary Examiner* — James J Seidleck
*Assistant Examiner* — S. Camilla Pourbohloul
(74) *Attorney, Agent, or Firm* — Karl E. Stauss; Ronald D. Bakule

(57) ABSTRACT

An opacifying pigment encapsulated in polymer including a pigment particle having an average particle diameter of from 0.005 to 5 microns and an index of refraction of at least 1.8; an aminophosphorus acid-functional first polymer having been used to disperse the pigment particle in an aqueous medium; and a second polymer that at least partially encapsulates the dispersed pigment particle is provided. A process for forming the opacifying pigment encapsulated in polymer and compositions including the particles are also provided.

3 Claims, No Drawings

OPACIFYING PIGMENT PARTICLE

This application claims the benefit of priority under 35 U.S.C. §119(e) of U.S. provisional patent application Ser. No. 61/190,961, filed on Sep. 4, 2008.

This invention relates to an opacifying pigment particle encapsulated in a polymer. More specifically, the invention relates to an opacifying pigment encapsulated in polymer including a pigment particle having an average particle diameter of from 0.005 to 5 microns and an index of refraction of at least 1.8; an aminophosphorus acid-functional first polymer having been used to disperse the pigment particle in an aqueous medium; and a second polymer that at least partially encapsulates the dispersed pigment particle. The invention also relates to a process for forming the opacifying pigment encapsulated in polymer and compositions including the particles.

Opacifying pigments provide whiteness, and opacity or "hiding", to opacifying coatings, such as paints, and to plastics. These pigments are present in most coatings that are designed to provide an opaque coating on and concealingly cover an undersurface or substrate surface to which the coating is applied. These pigments are also present in most plastics that are designed to be totally or partially opaque. In paints and plastics, an opacifying pigment is present whether the paint is white or colored. It is often desirable that opacifying coatings, paints, and plastics have a high opacifying capacity so as to enable the coating or paint to completely conceal the undersurface, even if of a sharply contrasting color, while utilizing a minimal application of the coating or paint, or thickness of plastic.

Opacifying coating, paint, and plastics manufacturers have long sought to formulate opacifying coating, paints, and plastics having a desired opacity by maximizing the level of hiding for a defined level of opacifying pigment, while minimizing the amount of opacifying pigment actually utilized. Without being bound by a particular theory, it is believed that opacifying effectiveness is a function of the spacing between the particles of opacifying pigment in the coating or plastic. Maximum light scattering efficiency occurs when the opacifying pigment particles have a certain diameter and spacing, so that the light scattering capability of each particle does not interfere with the light scattering capability of its neighboring particles. This condition may occur in coatings and plastics containing sufficiently low levels of opacifying pigment such that the individual opacifying pigment particles are isolated from each other. Coatings and plastics containing such low levels of opacifying pigment, however, often do not provide sufficient opacity or hiding at a desirable thicknesses. Achieving the desired levels of hiding or opacity typically requires higher levels of opacifying pigment. At these higher levels, a statistical distribution of opacifying pigment particles occurs, which results in at least some of the opacifying pigment particles being in such close proximity to one another that there is a loss of light scattering efficiency due to crowding of the opacifying pigment particles. Increased hiding efficiency is obtained by reducing the crowding of the opacifying pigment particles and minimizing the formation of clusters of opacifying pigment particles. One method to achieve this is to encapsulate the opacifying pigment particles within a polymer matrix by polymerizing polymer on the surface of the opacifying pigment particles.

U.S. Pat. No. 4,771,086 discloses pigment particles encapsulated in a polymer matrix, wherein the pigment particles are encapsulated in polymer by an emulsion polymerization process. The pigment particles, polymer, and surfactants used to stabilize the monomer emulsion are described as being free of ionic charges. Although this process is described as providing pigment particles encapsulated in a polymeric material, the requirement that the pigment particles, polymer, and surfactants used to stabilize the monomer emulsion be substantially free of ionic charge is very limiting as to pigment and polymer composition, and surfactant choice, and makes it difficult to maintain particle stability during the polymerization.

U.S. Patent application Ser. No, 2006/0009546A1 discloses pigment particles encapsulated in a polymer matrix, wherein the pigment particles are encapsulated in polymer by an emulsion polymerization process. Prior to the emulsion polymerization process, the pigment particles are modified by reaction with silane-functional oligomers. Although this process is described as providing pigment particles encapsulated in a polymeric material, the requirement that the pigment particles be modified with silane-functional oligomers adds processing complexity to the production of the encapsulated pigment particles, and requires the use of organic solvents for the production of the silane-functional oligomer which can have a negative environmental impact. The present invention relates to an opacifying pigment encapsulated in polymer including a pigment particle having an average particle diameter of from 0.005 to 5 microns and an index of refraction of at least 1.8; an aminophosphorus acid-functional first polymer having been used to disperse the pigment particle in an aqueous medium; and a second polymer that at least partially encapsulates the dispersed pigment particle, a process for forming the opacifying pigment encapsulated in polymer, and compositions including the particles. The opacifying pigment encapsulated in polymer provides desirable hiding efficiency and is capable of being formed in a aqueous medium without undue environmental issues.

In a first aspect of the present invention there is provided an opacifying pigment encapsulated in polymer comprising: a pigment particle having an average particle diameter of from 0.005 to 5 microns and an index of refraction of at least 1.8; an aminophosphorus acid-functional first polymer having been used to disperse said pigment particle in an aqueous medium; and a second polymer that at least partially encapsulates said dispersed pigment particle.

In a second aspect of the present invention there is provided a process for forming an opacifying pigment encapsulated in polymer comprising: (a) dispersing a pigment particle having an average particle diameter of from 0.005 to 5 microns and an index of refraction of at least 1.8 in an aqueous medium with an aminophosphorus acid-functional first polymer; and (b) performing an emulsion polymerization in the presence of said dispersed pigment particle to provide a second polymer that at least partially encapsulates said dispersed pigment particle.

In a third aspect of the present invention there is provided a composition comprising an opacifying pigment encapsulated in polymer comprising: a pigment particle having an average particle diameter of from 0.005 to 5 microns and an index of refraction of at least 1.8; an aminophosphorus acid-functional first polymer having been used to disperse said pigment particle in an aqueous medium; and a second polymer that at least partially encapsulates said dispersed pigment particle.

The present invention relates to an opacifying pigment encapsulated in polymer. The pigment particle has an average particle diameter of from 0.005 to 5 microns and an index of refraction of at least 1.8. By "opacifying" herein is meant that the particle engenders opacity when subject to light of a certain wavelength, not necessarily visible light. For example certain nano-particles included herein provide opacity when subject to light of wavelengths lower than the visible range. The shape of the pigment particles is not important. Suitable shapes for the pigment particles include spherical shapes, such as a regular sphere, an oblate sphere, a prolate sphere, and an irregular sphere; cubic shapes such as a regular cube and a rhombus; plate-like shapes including a flat plate, a concave plate, and a convex plate; and irregular shapes. The pigment particles having spherical shapes have average diameters in the range of from 5 nm to 5 micron, preferably in the range of from 100 nm to 500 nm, and more preferably, in the range of from 200 nm to 300 nm. Pigment particles having nonspherical shapes preferably have average diameters, defined as their maximum dimension, of from 5 nm to 5 micron, preferably up to 500 nm, and more preferably up to 300 nm. Information about the average diameters of pigment particles is typically provided by pigment particle suppliers.

The pigment particles are also characterized as having an index of refraction [$n_D$ (20° C.)] that is significantly greater than the index of refraction of the encapsulating polymer matrix. Suitable pigment particles have an index of refraction of at least 1.8, preferably at least 1.9, and more preferably at least 2.0. The indices of refraction for various materials are listed in *CRC Handbook of Chemistry and Physics*, 80th Edition, D. R. Lide, editor, CRC Press, Boca Raton, Fla., 1999, pages 4-139 to 4-146.

Suitable pigment particles include zinc oxide, antimony oxide, zirconium oxide, chromium oxide, iron oxide, lead oxide, zinc sulfide, lithopone, and forms of titanium dioxide such as anatase and rutile. Preferably, the pigment particles are selected from titanium dioxide and lead oxide. More preferably, the pigment particles are selected from rutile titanium dioxide and anatase titanium dioxide. Most preferably, the pigment particles are rutile titanium dioxide. A coating containing two different forms of a material, such as rutile and anatase titanium dioxide, is considered to have two different pigments.

The pigment particles alternatively have a uniform composition, or a heterogeneous composition with two or more phases. Certain heterogeneous pigment particles have an inner core and surrounding shell structure wherein one type of pigment particle forms the core and another type of particle forms the shell. The core and shell heterogeneous pigment particles include core/shell particles having a shell completely or incompletely encapsulating the core; core/shell particles having more than one core; dipolar particles; and particles having multiple domains of one phase on the surface of the other phase. Pigment particles, such as titanium dioxide, can have at least one coating of one or more of silica, alumina, zinc oxide, and zirconia. For example, certain embodiments of titanium dioxide particles suitable for use in coatings of the present invention have a coating of silica and a coating of alumina.

The pigment particles of the present invention have been dispersed with an aminophosphorus acid-functional first polymer in an aqueous medium. By "aqueous medium" herein is meant water and from 0 to 30%, by wt. based on the weight of the medium, of water-miscible compound(s). "Aminophosphorus acid-functional polymer" herein includes any polymer including at least one amine moiety and at least one phosphorus acid moiety. As used herein, the term "aminophosphorus acid-functional monomer" is meant to include any monomer containing at least one free radical polymerizable vinyl group, at least one amine moiety, and at least one phosphorus acid moiety. As used herein, the term "phosphorus acid moiety" is meant to include any of the following residues: —P(O)(OR)(OH), —OP(O)(OR)(OH), —OP(O)(OH)R', —P(O)(OH)R' where R can be H or alkyl or aryl, and R' can be alkyl or aryl. Also included in the definition of term "phosphorus acid moiety" are salts of the above residues.

Without being bound by a specific theory, it is believed that the amine and phosphorus acid-functional polymers of the present invention allow for the encapsulation of the dispersed pigment because of their unusually strong interaction with the surface of the pigment particles. It is well known that both amines and phosphorus acids adsorb strongly onto the surface of certain pigments, such as metal oxides. The phosphorus acids in particular are thought to form ligand-like bonds with the surface of metal oxides. It is thought that the inclusion of both amine and phosphorus acid groups into the polymer allow it to adsorb strongly enough onto the surface of the pigment particle that the dispersant polymer is not displaced during the formation of the second polymer that at least partially encapsulates the dispersed pigment particle particularly during emulsion polymerization.

The aminophosphorus acid-functional first polymer can be any of a polymer with at least one amine moiety and at least one phosphorus acid moiety located randomly in the polymer backbone, a block copolymer with a single amine and phosphorus acid including block and at least one block which does not have both amines and phosphorus acids, or a comb-graft polymer with a backbone that includes amines and phosphorus acids and teeth which do not include both amines and phosphorus acids. The block copolymers can have the amine and phosphorus acid including block located terminal to the polymer, or within the interior of the polymer chain. It is preferred that the polymer have at least two amine and two phosphorus acid groups, it is more preferred that the polymer have at least three amine and three phosphorus acid groups, it is most preferred that the polymer have at least four amine and four phosphorus acid groups. The number of amine and phosphorus acid groups may be the same or different. It is preferred that the ratio of amine to phosphorus acid groups be between 10:1 and 1:10, more preferred that the ratio of amine to phosphorus acid groups be between 3:1 and 1:4, most preferred that the ratio of amine to phosphorus acid groups be between 1.5:1 and 1:3, on a molar basis. The aminophosphorus acid-functional polymer may be made as a solution polymer in water or a non-aqueous solvent, or as a bulk polymer. The aminophosphorus acid-functional polymer may be made by any suitable polymerization process, such as addition polymerization of ethylenically unsaturated monomers such as acrylic, styrenic, or vinyl monomers. Polymers that contain both amine and phosphorus acid groups may be made by copolymerizing at least one amine-functional monomer and at least one phosphorus acid-functional monomer, or they may be made by including at least one monomer which is both amine-functional and phosphorus acid-functional in the monomer mix. As a further example, polymers that include both amine and phosphorus acid groups may be made by the addition polymerization of ethylenically unsaturated monomers, including in the monomer mix functional monomers that can be converted to amine or phosphorus acid groups after the polymerization is completed. Examples of monomers that can be converted to amines after the polymerization is completed include isocyanate-functional monomers, which can be reacted with primary-tertiary or secondary-tertiary diamines, epoxy-functional monomers that can be reacted with amines, and halomethylbenzyl-functional monomers that can be reacted with amines. Examples of monomers that can be converted to phosphorus acids after the polymerization is completed include isocyanate-functional monomers, which can be reacted with aminophosphates or aminophosphonates, and alcohol-functional monomers that can be reacted with phosphorylating agents such as pyrophosphoric acid. Block copolymers that include an aminophosphorus acid-functional polymer-including block may be made by any known process that is capable of producing such polymers. For example, block copolymers that include an aminophosphorus acid-functional polymer-including block may be made by the living free radical polymerization of ethylenically unsaturated monomers wherein the monomer composition of one of the monomer feeds includes at least one amine-functional and at least one phosphorus acid-functional unsaturated monomer. As a further example, block copolymers that include an aminophosphorus acid-functional polymer-including block may be made by the living free radical polymerization of ethylenically unsaturated monomers, including in the monomer mix functional monomers that can be converted to amine or phosphorus acid groups after the polymerization is completed. Comb-graph polymers that include an aminophosphorus acid-functional polymer-including backbone may be made by any known process that is capable of producing such polymers. For example, comb-graft polymers that include an aminophosphorus acid-functional polymer-including backbone may be made by the free radical polymerization of ethylenically unsaturated monomers wherein the monomer composition includes at least unsaturated macromer, one amine-functional unsaturated monomer, and at least one phosphorus acid-functional unsaturated monomer. As a further example, comb-graft polymers that include an aminophosphorus acid-functional polymer-including backbone may be made by the living free radical polymerization of ethylenically unsaturated monomers, including in the monomer mix functional monomers that can be converted to amine or phosphorus acid groups after the polymerization is completed. It is preferred that the aminophosphorus acid-functional polymer be either a block copolymer or a comb-graft polymer.

The aminophosphorus acid-functional polymer is typically prepared by the addition polymerization of ethylenically unsaturated monomers. Suitable monomers include styrene, butadiene, alpha-methyl styrene, vinyl toluene, vinyl naphthalene, ethylene, propylene, vinyl acetate, vinyl versatate, vinyl chloride, vinylidene chloride, acrylonitrile, methacrylonitrile, (meth)acrylamide, various C1-C40alkyl esters of (meth)acrylic acid; for example, methyl(meth)acrylate, ethyl (meth)acrylate, n-butyl(meth)acrylate, 2-ethylhexyl(meth)acrylate, cyclohexyl(meth)acrylate, n-octyl (meth)acrylate, n-decyl(meth)acrylate, n-dodecyl(meth)acrylate, tetradecyl(meth)acrylate, lauryl(meth)acrylate, oleyl(meth)acrylate, palmityl(meth)acrylate, and stearyl (meth)acrylate; other (meth) acrylates such as isobornyl (meth)acrylate, benzyl (meth)acrylate, phenyl(meth)acrylate, 2-bromoethyl(meth)acrylate, 2-phenylethyl (meth)acrylate, and 1-naphthyl(meth)acrylate, alkoxyalkyl (meth) acrylate, such as ethoxyethyl(meth)acrylate, mono-, di-, trialkyl esters of ethylenically unsaturated di- and tricarboxylic acids and anhydrides, such as ethyl maleate, dimethyl fumarate, trimethyl aconitate, and ethyl methyl itaconate; alcohol containing monomers such as hydroxyethyl(meth)acrylate, hydroxypropyl(meth)acrylate, hydroxybutyl(meth)acrylate; inorganic acid containing monomers such as sulfoethyl(meth)acrylate, and 2-(meth)acrylamido-2-methyl propanesulfonic acid; carboxylic acid containing monomers, such as (meth)acrylic acid, itaconic acid, fumaric acid, and maleic acid. Examples of suitable amine-functional monomers include dimethylamino ethyl(meth)acrylate, dimethylamino propyl(meth)acrylamide, and t-butylamino ethyl (meth)acrylate. Examples of phosphorus acid-functional monomers include phosphoethyl (meth)acrylate, phosphated polypropyleneoxide(meth)acrylates such as Sipomer PAM-200, phosphated polyethyleneoxide(meth)acrylates such as Sipomer PAM-100, and vinyl phosphonic acid. As used herein, the term "(meth)acrylate" refers to either acrylate or methacrylate and the term "(meth)acrylic" refers to either acrylic or methacrylic.

Examples of suitable monomers that contain both amine and phosphorus acid groups include:

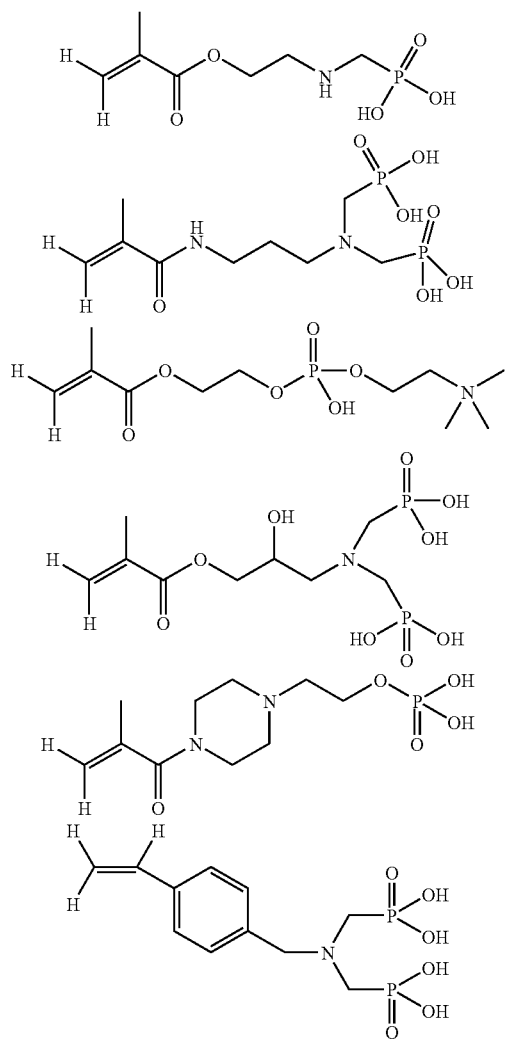

The aminophosphorus acid-functional polymer random copolymer, amine and phosphorus acid including block of the block copolymer, or amine and phosphorus acid including backbone of the comb-graft polymer may have a number average molecular weight of 500 to 200,000, preferably from 1000 to 50,000, more preferably from 1000 to 15,000, and most preferably from 1000 to 5,000. When the aminophosphorus acid-polymer is a block copolymer or a comb-graft polymer, the non-amine and phosphorus acid including block(s) or teeth, respectively, may have a number average molecular weight of 750 to 200,000, more preferably from 1000 to 50,000, more preferably form 1500 to 25,000, and most preferably from 5000 to 15,000. The molecular weights may be determined by GPC.

The pigment particles are dispersed in an aqueous medium with the aminophosphorus acid-functional polymer. This dispersion step is thought to be more facile if the aminophosphorus acid-functional polymer is soluble in water. The aminophosphorus acid-functional polymer can be made water-soluble by the inclusion of sufficient amine and or phosphorus acid groups, as well as by including other water-soluble monomers such as alcohol-functional monomers such as hydroxyethyl(meth)acrylate; amide-functional monomers such as (meth)acrylamide; acid-functional monomers such as (meth)acrylic acid and sulfoethyl(meth)acrylate; or combinations thereof. The levels of water-soluble monomers necessary to render the aminophosphorus acid-functional polymer or polymer block or teeth water-soluble will depend on the molecular weight and nature of the co-monomers included in the composition of the aminophosphorus acid-functional polymer, blocks, or teeth, as is understood in the art. It is preferred that the aminophosphorus acid-functional polymer is water soluble. When the aminophosphorus acid-functional polymer is a block copolymer or a comb-graph polymer, it is preferred that the non-amine and non-phosphorus acid block(s) or teeth, respectively, be in themselves water-soluble.

The opacifying pigment encapsulated in polymer of the present invention includes a second polymer that at least partially encapsulates the pigment particle that has been dispersed with the aminophosphorus acid-functional polymer. The second polymer is typically prepared by free radical emulsion polymerization of ethylenically unsaturated monomers in the presence of the pigment particle that has been dispersed with the aminophosphorus acid-functional polymer. The degree of encapsulation of the pigment particle may be determined using an electron micrograph; preferably greater than 50%, more preferably greater than 75%, of the surface area of the particle is encapsulated with the second polymer. The thickness of the second polymer encapsulant layer or shell may be up to 500 nm; for TiO2, for example, preferred thickness of the second polymer encapsulant layer or shell is typically between 20 nm and 150 nm, preferably from 40 nm to 100 nm.

The process for forming an opacifying pigment encapsulated in polymer of the present invention includes: (a) dispersing a pigment particle having an average particle diameter of from 0.005 to 5 microns and an index of refraction of at least 1.8 in an aqueous medium with an aminophosphorus acid-functional first polymer; and (b) performing an emulsion polymerization in the presence of said dispersed pigment particle to provide a second polymer that at least partially encapsulates said dispersed pigment particle.

A step in the process of the present invention consists of dispersing pigment particles in an aqueous medium with an aminophosphorus acid-functional polymer. This dispersion step can be done by any means commonly used to disperse pigments in an aqueous medium, including grinding with a high speed dispersator, or grinding in media mills or ball mills. The weight ratio of the aminophosphorus acid-functional polymer to that of the pigment particles can range from 0.1% to 25%, preferably from 0.25% to 10%, more preferably from 0.5% to 5%, and most preferably from 0.5% to 2%.

A subsequent step in the process of the present invention consists of at least partially encapsulating the dispersed pigment particles in a second polymer typically by performing an emulsion polymerization in the presence of the dispersed pigment particles.

The emulsion polymerization can be carried out by methods well known in the polymer arts, and include multiple stage polymerization processes. Various synthesis adjuvants such as initiators, chain transfer agents, and surfactants are optionally utilized in the polymerization. In general, the emulsion polymerization is of a seeded type emulsion polymerization, with the dispersed pigment particles acting as the seeds. In one embodiment of the present invention, the reaction vessel is charged with water, dispersed pigment, and optionally surfactants and other polymerization adjuvants, and then the monomers for the second polymer are added to the kettle. In another embodiment of the present invention, the reaction vessel is charged with water, dispersed pigment, and optionally surfactants and other polymerization adjuvants, and then a part of the monomers for the polymer matrix is added to the kettle, and then a second seed consisting of emulsified polymer particles, made separately, is added, and finally the remainder of the monomer for the polymer matrix is added to the kettle. In yet another embodiment of the present invention, the reaction vessel is charged with water, and optionally surfactants and other polymerization adjuvants and optionally a polymer seed, then a part of the monomers for the polymer matrix is added to the kettle, then the dispersed pigment is added to the kettle, and finally the remainder of the monomer for the polymer matrix is added to the kettle. The polymerization can be run as a shot, or as multiple shots, or by continuously feeding in the monomer over time. The monomer can be added neat or emulsified in water with appropriate surfactants.

Polymerization of the monomers for the second polymer is effected by addition of a polymerization initiator. The polymerization initiator may be added to the kettle prior to the monomer addition, or concurrent with the monomer addition, after the monomer addition, or as a combination of these. Examples of suitable polymerization initiators include polymerization initiators that thermally decompose at the polymerization temperature to generate free radicals. Examples include both water-soluble and water-insoluble species. Examples of suitable free radical-generating initiators include persulfates, such as ammonium and alkali metal (potassium, sodium, and lithium) persulfate; azo compounds, such as 2,2'-azobis(isobutyronitrile), 2,2'-azobis(2,4-dimethylvaleronitrile), and t-butyl azocyanocyclohexane; hydroperoxides, such as t-butyl hydroperoxide and cumene hydroperoxide; peroxides, such as benzoyl peroxide, caprylyl peroxide, di-t-butyl peroxide, ethyl 3,3'-di-(t-butylperoxy)butyrate, ethyl 3,3'-di(t-amulperoxy) butyrate, t-amylperoxy-2-ethyl hexanoate, and t-butylperoxy pivilate; peresters, such as t-butyl peracetate, t-butyl perphthalate, and t-butyl perbenzoate; as well as percarbonates, such as di(1-cyano-1-methylethyl)peroxy dicarbonate; and perphosphates.

Polymerization initiators are used alone, and alternatively, as the oxidizing component of a redox system, which also includes a reducing component, such as an acid selected from the group consisting of: ascorbic acid, malic acid, glycolic acid, oxalic acid, lactic acid, and thioglycolic acid; an alkali metal sulfite, more specifically a hydrosulfite, such as sodium hydrosulfite; a hyposulfite, such as potassium hyposulfite; and a metabisulfite, such as potassium metabisulfite; and sodium formaldehyde sulfoxylate.

Suitable levels of initiator and the optional reducing component include proportions of from 0.001% to 5% each, based on the weight of the monomers in the monomer mixture to be polymerized. Accelerators such as chloride and sulfate salts of cobalt, iron, nickel, and copper are generally used in small amounts. Examples of redox catalyst systems include t-butyl hydroperoxide/sodium formaldehyde sulfoxylate/Fe(II), and ammonium persulfate/sodium bisulfite/sodium hydrosulfite/Fe(II).

Chain transfer agents are optionally added to the aqueous reaction medium to control molecular weight of the polymer matrix. Examples of chain transfer agents include mercaptans, polymercaptans, and polyhalogen compounds. Examples of suitable chain transfer agents include alkyl mercaptans, such as ethyl mercaptan, n-propyl mercaptan, n-butyl mercaptan, isobutyl mercaptan, t-amyl mercaptan, n-hexyl mercaptan, cyclohexyl mercaptan, n-octyl mercaptan, n-decyl mercaptan, n-dodecyl mercaptan; 3-mercaptoproprionic acid; 2-hydroxyethyl mercaptan; alcohols, such as isopropanol, isobutanol, lauryl alcohol, and t-octyl alcohol; and halogenated compounds, such as carbon tetrachloride, tetrachloroethylene, and trichlorobromoethane. Generally from 0 to 10% by weight, based on the weight of the monomers in the monomer mixture, is used to prepare the polymer particles. Other techniques for controlling molecular weight, known in the art, include selecting the ratio of the initiator to total monomer amount.

Catalyst and/or chain transfer agent are optionally dissolved or dispersed in separate or the same fluid medium, and gradually added to the polymerization vessel. Monomer, neat, dissolved, or dispersed in a fluid medium, is optionally added simultaneously with the catalyst and/or the chain transfer agent.

The aqueous reaction medium typically contains surfactant to stabilize the growing second polymer-encapsulated particles during polymerization and to discourage aggregation of the polymer-encapsulated pigment particles in the resulting aqueous dispersion. One or more surfactants, including anionic and nonionic surfactants, and mixtures thereof, are commonly used. Many examples of surfactants suitable for emulsion polymerization are given in *McCutcheon's Detergents and Emulsifiers* (M C Publishing Co. Glen Rock, NF), published annually. Other types of stabilizing agents, such as protective colloids, are optionally used. However, it is preferred that the amount and type of stabilizing surfactant or other type of stabilizing agent employed during the polymerization reaction be selected so that residual stabilizing agent in the resulting aqueous dispersion does not significantly interfere with the properties of the aqueous dispersion, the properties of compositions including the aqueous dispersion, or articles prepared from the aqueous dispersion.

Suitable anionic surfactants include, for example, alkali fatty alcohol sulfates, such as sodium lauryl sulfate; arylalkyl sulfonates, such as potassium isopropylbenzene sulfonate; alkali alkyl sulfosuccinates, such as sodium octyl sulfosuccinate; and alkali arylalkylpolyethoxyethanol sulfates or sulfonates, such as sodium octyl phenoxypolyethoxyethyl sulfate, having 1 to 5 oxyethylene units.

Suitable nonionic surfactants include, for example, alkyl phenoxypolyethoxy ethanols having alkyl groups of from 7 to 18 carbon atoms and from 6 to 60 oxyethylene units, such as, for example, heptyl phenoxypolyethoxyethanols; ethylene oxide derivatives of long chained carboxylic acids, such as lauric acid, myristic acid, palmitic acid, oleic acid, or mixtures of acids, such as those found in tall oil, containing from 6 to 60 oxyethylene units; ethylene oxide condensates of long chained alcohols such as octyl, decyl, lauryl, or cetyl alcohols, containing from 6 to 60 oxyethylene units; ethylene oxide condensates of long chain or branched chain amines, such as dodecyl amine, hexadecyl amine, and octadecyl amine, containing from 6 to 60 oxyethylene units; and block copolymers of ethylene oxide sections combined with one or more hydrophobic propylene oxide sections. High molecular weight polymers, such as hydroxyethyl cellulose, methyl cellulose, and polyvinyl alcohol, are also usable.

After the emulsion polymerization is complete, the polymer encapsulated pigment particles may be provided as an aqueous dispersion, or alternately they may be provided as a solid in the form of a powder or pellet. The polymer encapsulated pigment particles may be removed from the water from the emulsion polymerization by any appropriate technique including, for example, evaporative drying, spray drying, filtration, centrifugation, or coagulation. When the polymer-encapsulated pigment particles are provided as a solid, it is preferred that the Tg of the second polymer, or the Tg of the outermost phase of the second polymer in the case where the second polymer contains multiple phases, is above the temperature at which the polymer-encapsulated pigment particles will be stored, transported, and optionally processed prior to final application.

"Glass transition temperature" or "Tg" as used herein, is that calculated by the Fox equation [*Bulletin of the American Physical Society* 1, 3 Page 123 (1956)], as follows: $1/T_g = w_1/T_{g(1)} + w_2/T_{g(2)}$ For a copolymer, $w_1$ and $w_2$ are the weight fractions of the two co-monomers, and Tg(1) and Tg(2) are the glass transition temperatures, in degrees Kelvin, of the two corresponding homopolymers. For polymers containing three or more monomers, additional terms (wn/Tg(n)) are added. The Tg of the glass transition temperatures of homopolymers, are found, for example, in "Polymer Handbook", edited by J. Brandrup and E. H. Immergut, Interscience Publishers.

The composition of the present invention including an opacifying pigment encapsulated in polymer is typically a coating or a plastic. Optionally, the coating or plastic also includes one or more of extender particles, secondary pigment particles, or third polymers.

The binder of the coating or plastic of the present invention is the continuous medium containing the polymer-encapsulated pigment particles. The binder may consist solely of the second polymer which encapsulates the pigment particles, or it may be a mixture of the encapsulating second polymer and one or more third polymers. Both the second polymer and third polymer are independently, alternatively a homopolymer, a copolymer, an interpenetrating network polymer, and a blend of two or more polymers or copolymers. Suitable second polymers and third polymers include acrylic (co)polymers, vinyl acetate polymers, vinyl/acrylic copolymers, styrene/acrylic copolymers, polyurethanes, polyureas, polyepoxides, polyvinyl chlorides, ethylene/vinyl acetate polymers, styrene/butadiene polymers, polyester polymers, polyethers, and the like, and mixtures thereof.

The binder is a polymer or a mixture of a polymer and a pre-polymeric material. The polymer-encapsulated pigment particles are alternatively provided in a liquid medium such as an organic solvent or water, or a mixture of organic solvents and water, or are provided as a solid, such as a powder. The optional third polymer is alternatively provided in a liquid medium such as a solution polymer, an emulsion polymer, or a suspension polymer, or is provided as a solid, such as a polymer powder or an extrusion polymer. Either or both the second polymer of the polymer-encapsulated pigment or the optional third polymer may contain reactive groups, which upon formation of a coating film or finished plastic part, crosslink either with themselves or with externally added crosslinkers to provide a crosslinked binder. Conventional crosslinking agents such as, for example, polyaziridine, polyisocyanate, polycarboduimide, polyepoxide, polyaminoplast, polyalkoxysilane, polyoxazoline, polyamine, and a polyvalent metal compound can be used as externally added crosslinkers. Typically, from 0 to 25 weight % of the crosslinking agent is used, based on the dry weight of the polymer.

The polymers which form the binder typically have glass transition temperatures in the range of from −60° C. to 150° C., as calculated by the Fox equation. The coating or plastic composition optionally contains coalescents or plasticizers to provide the polymers with effective film formation temperatures at or below the temperature at which the coating is applied or cured, or the plastic part is formed. The level of optional coalescent is in the range of from 0.1 weight % to 40 weight %, based on the weight of the polymer solids.

Alternatively, part of the binder is at least one prepolymeric material which is cured to form part of the binder. A pre-polymeric material is a material which is cured to form a polymer. A coating or plastic according to the present invention that is made in part with a pre-polymeric binder is prepared by applying a coating composition onto a substrate, or extruding or forming a plastic part, which contains polymer-encapsulated pigment particles and at least one pre-polymeric material as the binder, and then polymerizing or crosslinking the at least one pre-polymeric material to finish forming the binder. Examples of pre-polymeric materials are ethylenically unsaturated monomers and oligomers, and two-part crosslinking systems such as compositions containing isocyanate groups and alcohol groups.

The coating or plastic of this invention optionally contains extender particles. The extender particles have an index of refraction which is similar to the index of refraction of the polymer matrix, and do not significantly scatter light. Extender particles have an index of refraction of less than 1.8 and typically greater than or equal to 1.3. Suitable extender particles include calcium carbonate, calcium sulfate, barium sulfate, mica, clay, calcined clay, feldspar, nepheline, syenite, wollastonite, diatomaceous earth, alumina silicates, non-film forming polymer particles, aluminum oxide, silica, and talc. Other examples of extenders include solid bead extenders, also known in the art as solid bead pigments, such as polystyrene and polyvinyl chloride beads.

The coating or plastic of this invention optionally contains secondary pigment particles. The secondary pigment particles have an index of refraction less than the index of refraction of the polymer matrix. Secondary pigment particles include pigment particles containing air voids, such as polymer particles containing air voids. The air void is characterized as having an index of refraction close to or equal to 1. Secondary pigment particles including microsphere pigments such as polymer particles containing one or more voids and vesiculated polymer particles are disclosed in U.S. Pat. Nos. 4,427,835; 4,920,160; 4,594,363; 4,469,825; 4,468,498; 4,880,842; 4,985,064; 5,157,084; 5,041,464; 5,036,109; 5,409,776; and 5,510,422.

The coating or plastic of this invention contains from 1 to 50 volume % pigment particles in the form of polymer-encapsulated pigment particles, preferably from 3 to 30 volume %, and more preferably from 5 to 20 volume %, based on the total volume of the coating or plastic. The coating or plastic contains from 10 to 99 volume % polymer matrix, preferably from 20 to 97 volume %, and more preferably from 25 to 80 volume %, based on the total volume of the coating or plastic. The coating or plastic contains from 0 to 70 volume % extender particles, preferably from 0 to 65 volume %, and more preferably from 0 to 60 volume %, based on the total volume of the coating or plastic. The coating or plastic contains from 0 to 20 volume % secondary pigment particles, preferably from 0 to 17 volume %, and more preferably from 0 to 15 volume %, based on the total volume of the coating or plastic.

The pigment volume concentration (PVC) of each type of pigment particles is the percentage of the volume occupied by the particles of that pigment, based on the total volume of the coating or plastic. For a coating or plastic containing one or more types of pigment particles, the PVC for a single type of pigment particles, Vi, is expressed by equation 1a: $V_i = 100 V_{p,i}/V_c$ where Vp, is the volume of that single type of pigment particles and $V_c$ is the total volume of the coating or plastic. The total volume of the coating or plastic is the sum of the volumes of all components of the coating or plastic including all the pigment particles, the secondary pigment particles, the polymer matrix, the secondary resins, and the extender particles. The PVC is commonly reported without units or as a percentage. For example, a coating having a pigment occupying 20 volume % of the total volume of the coating has a PVC reported as 20 or 20%.

The coating composition of the present invention optionally may also include other materials commonly found in coatings such as pigment particles which do not fall under the present invention, extenders, other polymers, hollow sphere pigments, solvents, coalescents, wetting agents, defoamers, rheology modifiers, crosslinkers, dyes, pearlescents, adhesion promoters, dispersants, leveling agents, optical brighteners, ultraviolet stabilizers, preservatives, biocides, and antioxidants.

Examples of coatings include inks, paper coatings; architectural coatings, such as interior and exterior house paints, wood coatings and metal coatings; coatings for leather; coatings for textiles and nonwovens; adhesives; powder coatings; and traffic paints such as those paints used to mark roads, pavements, and runways. Liquid coatings may be water or solvent based. When the coating is a powder coating, it is preferred that the Tg of the polymeric matrix, or the Tg of the outer most phase of the polymeric matrix in the case where the polymeric matrix contains multiple phases, is above the temperature at which the coating will be stored, transported, and optionally processesed prior to final application. When the coating is a solvent-based coating, it is preferred that the second polymer of the polymer-encapsulated pigment particles is not substantially soluble in the solvent or mixture of solvents utilized in the coating.

The plastic of the present invention optionally may also include other materials commonly found in plastics such as pigment particles which do not fall under the present invention, extenders, other polymers, hollow sphere pigments, plasticizers, flow agents, and crosslinkers. "Plastics" herein includes solid or flexible materials in the form of objects, films, etc.

The examples which follow illustrate aspects of the present invention. The abbreviation "g" represents "grams". The abbreviation "mm" represents "millimeters". The abbreviation "cm" represents "centimeters". The abbreviation "mil" represents "1/1000ths of an inch".

Preparation of Aminophosphorus Acid-Functional Polymer

EXAMPLE APAP-1 (A Comb-Graft Polymer)

Prep of teeth: A 250 ml flask equipped with a magnetic stirrer, N2-inlet, reflux condenser, heating mantel, and thermocouple was charged with 22.5 g of MMA, 10.0 g of BA, 18.0 g of SEM, 1.43 g of 2-(n-butylamino)ethanethiol, 0.25 g of AIBN, and 90 g of anhydrous n-propanol. The flask was purged with N2, and heated to 60° C., at which point the heating mantle was turned off and the mixture was allowed to exotherm to 80° C. The heating mantle was turned back on and the temperature held at 80° C. for 3 hours. The temperature was then raised to 93° C., and 0.25 g AIBN slurried in 1.0 g anhydrous n-propanol was added. The temperature was held at 93° C. for 1 hr, then the flask was cooled to room temperature. 0.02 g of 4-hydroxy TEMPO was added to the flask, followed by 1.76 g of ICEMA. The mixture was allowed to sit overnight, then was poured into hexane to precipitate the polymer. The solid polymer was dried at room temperature for 3 days to remove residual hexane and propanol, then 5.7 g of solid polymer was dissolved in a mixture of 31.7 g water and 0.59 g of 28% ammonia.

Prep of backbone: A 100 ml flask equipped with a magnetic stirrer, N2-inlet, reflux condenser, heating mantel, and thermocouple was charged with 36.67 g of the polymer solution, 0.04 g of 3-mercaptopropionic acid, 0.23 g of DMAEMA, 1.10 g of PAM-200 (phosphated polypropylene oxide methacrylate), and 0.0135 g of Vazo 56. The flask was purged with N2, and heated to 78° C. and held for 3 hours. The temperature was then raised to 83° C., and 0.0090 g VAZO 56 in 1.0 g water was added. The temperature was held at 83° C. for 1 hr, then the flask was cooled to room temperature. The pH was measured to be 7.0

EXAMPLE APAP-2 (A Comb-Graft Polymer)

Prep of teeth: A 250 ml flask equipped with a magnetic stirrer, N2-inlet, reflux condenser, heating mantel, and thermocouple is charged with 22.5 g of MMA, 10.0 g of BA, 18.0 g of SEM, 1.43 g of 2-(n-butylamino)ethanethiol, 0.25 g of AIBN, and 90 g of anhydrous n-propanol. The flask is purged with N2, and is heated to 60° C., at which point the heating mantle is turned off and the mixture is allowed to exotherm to 80° C. The heating mantle is turned back on and the temperature is held at 80° C. for 3 hours. The temperature is then raised to 93° C., and 0.25 g AIBN slurried in 1.0 g anhydrous n-propanol is added. The temperature is held at 93° C. for 1 hr, then the flask is cooled to room temperature. 0.02 g of 4-hydroxy TEMPO is added to the flask, followed by 1.76 g of ICEMA. The mixture is allowed to sit overnight, then is poured into hexane to precipitate the polymer. The solid polymer is dried at room temperature for 3 days to remove residual hexane and propanol, then 5.7 g of solid polymer is dissolved in a mixture of 31.7 g water and 0.59 g of 28% ammonia.

Prep of backbone: A 100 ml flask equipped with a magnetic stirrer, N2-inlet, reflux condenser, heating mantel, and thermocouple is charged with 36.67 g of the polymer solution, 0.04 g of 3-mercaptopropionic acid, 0.35 g of DMAPMA, 0.55 g of MPC (2-methacryloyloxyethyl phosphorylcholine) (MPC is a monomer containing both amine and phosphorus acid groups), and 0.0135 g of Vazo 56. The flask is purged with N2, and heated to 78° C. and is held for 3 hours. The temperature is then raised to 83° C., and 0.0090 g VAZO 56 in 1.0 g water is added. The temperature is held at 83° C. for 1 hr, then the flask is cooled to room temperature.

EXAMPLE APAP-3 (A Block Copolymer)

Prep of N-(4-vinylbenzyl)-bis-N,N-(phosphonomethyl) amine (a monomer with both amine and phosphorus acid groups): A 100 ml flask equipped with a magnetic stirrer, N2-inlet, reflux condenser, heating mantel, and thermocouple is charged with 12.74 g N-(4-vinylbenzyl)amine hydrochloride, 12.33 g phosphorous acid, 0.005 g 4-hydroxy TEMPO, and 25 g water. The flask is purged with N2 and heated to reflux. 24.4 g of a 37% solution of formaldehyde in water is added dropwise over 1 hr, and then the temperature is maintained at reflux for 1 additional hour.

Prep of oligomeric mercaptan chain transfer agent: A 250 ml flask equipped with a magnetic stirrer, N2-inlet, reflux condenser, heating mantel, and thermocouple is charged with 12.5 g of MMA, 10.0 g of BA, 18.0 g of SEM, 10 g of HEMA, 1.43 g of 2-(n-butylamino)ethanethiol, 0.25 g of AIBN, and 90 g of anhydrous n-propanol. The flask is purged with N2, and is heated to 60° C., at which point the heating mantle is turned off and the mixture is allowed to exotherm to 80° C. The heating mantle is turned back on and the temperature is held at 80° C. for 3 hours. The temperature is then raised to 93° C., and 0.25 g AIBN slurried in 1.0 g anhydrous n-propanol is added. The temperature is held at 93° C. for 1 hr, then the flask is cooled to room temperature and 1.22 g of cyclohexene sulfide is added. The mixture is allowed to sit for 3 days, then is poured into hexane to precipitate the polymer. The solid polymer is dried at room temperature for 3 days to remove residual hexane and propanol, then 5.7 g of solid polymer is dissolved in a mixture of 31.7 g water and 0.59 g of 28% ammonia.

Prep of block copolymer: A 100 ml flask equipped with a magnetic stirrer, N2-inlet, reflux condenser, heating mantel, and thermocouple is charged with 36.67 g of the polymer solution, 0.02 g of 3-mercaptopropionic acid, 0.35 g of DMAEMA, 0.55 g of N-(4-vinylbenzyl)-bis-N,N-(phosphonomethyl)amine, and 0.0135 g of Vazo 56. The flask is purged with N2, and heated to 78° C. and is held for 3 hours. The temperature is then raised to 83° C., and 0.0090 g VAZO 56 in 1.0 g water is added. The temperature is held at 83° C. for 1 hr, then the flask is cooled to room temperature.

EXAMPLE APAP-4 (A Random Copolymer)

A 100 ml flask equipped with a magnetic stirrer, N2-inlet, reflux condenser, heating mantel, and thermocouple is charged with 0.45 g of 3-mercaptopropionic acid, 4.0 g of DMAPMA, 5.0 g of MPC (2-methacryloyloxyethyl phosphorylcholine), 3.0 g BA, 3.0 g MMA, and 0.075 g of Vazo 56. The flask is purged with N2, and heated to 78° C. and is held for 3 hours. The temperature is then raised to 83° C., and 0.075 g VAZO 56 in 1.0 g water is added. The temperature is held at 83° C. for 1 hr, then the flask is cooled to room temperature.

Preparation of Water Dispersed Pigment Particles

EXAMPLE WDPP-1

A steel grind pot was charged with 17.5 g of APAP-1 and 85.8 g of water. 309.8 g of TiO2 (TiPure R-706) was added slowly while grinding at ~2000 rpm using a Premier Mill Corp. Model 50 dispersator equipped with a disk blade. After addition of the TiO2, an additional 26.77 g of water was added and the slurry was ground for 20min. The solids were 71.1%

EXAMPLE WDPP-2

A steel grind pot is charged with 17.5 g of APAP-2 and 110 g of water. 309.8 g of TiO2 (TiPure R-706) is added slowly while grinding at ~2000 rpm using a Premier Mill Corp. Model 50 dispersator equipped with a disk blade. After addition of the TiO2 the slurry is ground for 20min.

EXAMPLE WDPP-3

A steel grind pot is charged with 22.0 g of APAP-3 and 110 g of water. 309.8 g of TiO2 (TiPure R-706) is added slowly while grinding at ~2000 rpm using a Premier Mill Corp. Model 50 dispersator equipped with a disk blade. After addition of the TiO2 is ground for 20 min.

EXAMPLE WDPP-4

A steel grind pot is charged with 9.0 g of APAP-3 and 110 g of water. 309.8 g of TiO2 (TiPure R-706) is added slowly while grinding at ~2000 rpm using a Premier Mill Corp. Model 50 dispersator equipped with a disk blade. After addition of the TiO2 is ground for 20 min.

Preparation of Polymer-Encapsulated Pigment Particles

EXAMPLE PEPP-1

A 250 ml, four necked round bottom flask was equipped with paddle stirrer, thermometer, nitrogen inlet, and reflux condenser. 50.63 grams of WDPP-1 was added to the flask along with a mixture of 0.6 grams sodium dodecyl benzene sulfonate (SDS) in 110 grams of deionized water. The content of the flask was heated to 50° C. under a nitrogen atmosphere. At 50° C., 1.0 gram of 0.1% ferrous sulfate heptahydrate in water was added to the flask. Next, co-feeds including a solution of 0.5 grams of t-BHP mixed with 18.0 grams of DI water, along with a separate solution of 0.28 grams of sodium sulfoxylate formaldehyde (SSF) mixed with 18.0 grams of DI water were both added to the kettle at a rate of 0.15 gram/minute. Two minutes after the start of the co-feeds, a monomer emulsion (ME) which had been prepared previously by mixing 7.0 grams of DI water, 1.45 grams SDS, 20.9 grams of butyl methacrylate, 14.4 grams of methyl methacrylate, and 0.7 grams of methacrylic acid was added to the flask at a rate of 0.5 grams/minute. The temperature of the flask was held at 50° C. throughout the ME feed. Upon completion of the ME feed, the co-feeds where continued for another 30 minutes. Upon completion of the co-feeds the batch was cooled to room temperature. 2.0 grams of 14% ammonium hydroxide was added to the flask and the batch was filtered to remove any coagulum. Final solids of the batch were 28.9%.

EXAMPLE PEPP-2

A 250 ml, four necked round bottom flask is equipped with paddle stirrer, thermometer, nitrogen inlet, and reflux condenser. 50.63 grams of WDPP-2 is added to the flask along with a mixture of 0.6 grams sodium dodecyl benzene sulfonate (SDS) in 110 grams of deionized water. The content of the flask is heated to 50° C. under a nitrogen atmosphere. At 50° C., 1.0 gram of 0.1% ferrous sulfate heptahydrate in water is added to the flask. Next, co-feeds including a solution of 0.5 grams of t-BHP mixed with 18.0 grams of DI water, along with a separate solution of 0.28 grams of sodium sulfoxylate formaldehyde (SSF) mixed with 18.0 grams of DI water are both added to the kettle at a rate of 0.15 gram/minute. Two minutes after the start of the co-feeds, a monomer emulsion (ME1) which is separately prepared by mixing 1.4 grams of DI water, 0.29 grams SDS, 3.53 grams of butyl methacrylate, 3.53 grams of methyl methacrylate, and 0.14 grams of methacrylic acid is added to the flask at a rate of 0.5 grams/minute. The temperature of the flask is held at 50° C. throughout the ME1 feed. Upon completion of the ME1 feed, a second monomer emulsion (ME2) which is separately prepared by mixing 5.6 grams of DI water, 1.16 grams SDS, 14.12 grams of butyl methacrylate, 14.12 grams of methyl methacrylate, and 0.56 grams of methacrylic acid is added to the flask at a rate of 0.5 grams/minute. The temperature of the flask is held at 50° C. throughout the ME2 feed. Upon completion of the ME2 feed, the co-feeds are continued for another 30 minutes. Upon completion of the co-feeds the batch is cooled to room temperature. 2.0 grams of 14% ammonium hydroxide is added to the flask and the batch is filtered to remove any coagulum.

EXAMPLE PEPP-3

A 250 ml, four necked round bottom flask is equipped with paddle stirrer, thermometer, nitrogen inlet, and reflux condenser. 50.63 grams of WDPP-3 is added to the flask along with a mixture of 0.6 grams sodium dodecyl benzene sulfonate (SDS) in 110 grams of deionized water. The content of the flask is heated to 50° C. under a nitrogen atmosphere. At 50° C., 1.0 gram of 0.1% ferrous sulfate heptahydrate in water is added to the flask. Next, co-feeds including a solution of 0.5 grams of t-BHP mixed with 18.0 grams of DI water, along with a separate solution of 0.28 grams of sodium sulfoxylate formaldehyde (SSF) mixed with 18.0 grams of DI water are both added to the kettle at a rate of 0.15 gram/minute. Two minutes after the start of the co-feeds, a monomer emulsion (ME) which is separately prepared by mixing 7.0 grams of DI water, 1.45 grams SDS, 23.7 grams of butyl acrylate, 19.4 grams of styrene, and 0.7 grams of methacrylic acid is added to the flask at a rate of 0.5 grams/minute. The temperature of the flask is held at 50° C. throughout the ME feed. Upon completion of the ME feed, the co-feeds are continued for another 30 minutes. Upon completion of the co-feeds the batch is cooled to room temperature. 2.0 grams of 14% ammonium hydroxide is added to the flask and the batch is filtered to remove any coagulum.

EXAMPLE PEPP-4

A 250 ml, four necked round bottom flask is equipped with paddle stirrer, thermometer, nitrogen inlet, and reflux condenser. 50.63 grams of WDPP-4 is added to the flask along with a mixture of 0.6 grams sodium dodecyl benzene sulfonate (SDS) in 110 grams of deionized water. The content of the flask is heated to 50° C. under a nitrogen atmosphere. At 50° C., 1.0 gram of 0.1% ferrous sulfate heptahydrate in water is added to the flask. Next, co-feeds including a solution of 0.5 grams of t-BHP mixed with 18.0 grams of DI water, along with a separate solution of 0.28 grams of sodium sulfoxylate formaldehyde (SSF) mixed with 18.0 grams of DI water are both added to the kettle at a rate of 0.15 gram/minute. Two minutes after the start of the co-feeds, a monomer emulsion (ME) which is separately prepared by mixing 7.0 grams of DI water, 1.45 grams SDS, 21.5 grams of 2-ethylhexyl acrylate, 21.6 grams of methyl methacrylate, 0.25 grams of n-dodecylmercaptan, and 1.0 grams of methacrylic acid is added to the flask at a rate of 0.5 grams/minute. The temperature of the flask is held at 50° C. throughout the ME feed. Upon completion of the ME feed, the co-feeds are continued for another 30 minutes. Upon completion of the co-feeds the batch is cooled to room temperature. 2.0 grams of 14% ammonium hydroxide is added to the flask and the batch is filtered to remove any coagulum.

We claim:

1. A process for forming an opacifying pigment encapsulated in polymer comprising:
   (a) dispersing a pigment particle having an average particle diameter of from 0.005 to 5 microns and an index of refraction of at least 1.8 in an aqueous medium with an aminophosphorus acid-functional water soluble first polymer formed by the addition polymerization of ethylenically unsaturated monomers selected from the group consisting of: styrene, butadiene, alpha-methyl styrene, vinyl toluene, vinyl naphthalene, ethylene, propylene, vinyl acetate, vinyl versatate, vinyl chloride, vinylidene chloride, acrylonitrile, methacrylonitrile, (meth)acrylamide, $C_1$-$C_{40}$ alkyl esters of (meth)acrylic acid, isobornyl (meth)acrylate, benzyl (meth)acrylate, phenyl (meth)acrylate, 2-bromoethyl (meth)acrylate, 2-phenylethyl (meth)acrylate, 1-naphthyl (meth)acrylate, ethoxyethyl (meth)acrylate, mono-, di-, and trialkyl esters of ethylenically unsaturated di- and tricarboxylic acids and anhydrides, hydroxyethyl (meth)acrylate, hydroxypropyl (meth)acrylate, hydroxybutyl (meth)acrylate, sulfoethyl (meth)acrylate, 2-(meth)acrylamido-2-methyl propanesulfonic acid, (meth)acrylic acid, itaconic acid, fumaric acid, maleic acid, dimethylamino ethyl(meth)acrylate, dimethylamino propyl(meth)acrylamide, t-butylamino ethyl(meth)acrylate, phosphoethyl (meth)acrylate, phosphated polypropyleneoxide(meth)acrylates, phosphated polyethyleneoxide(meth)acrylates, vinyl phosphonic acid,

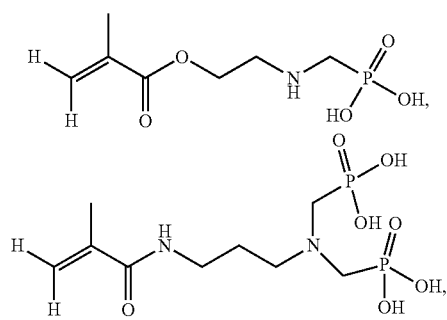

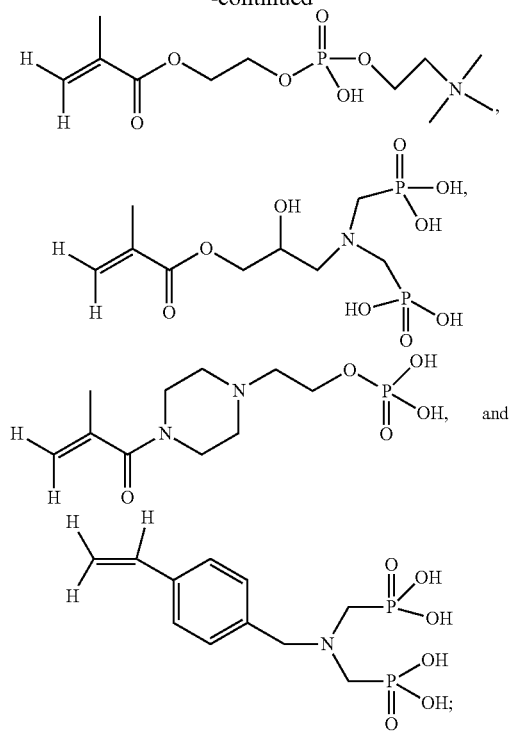

and
   (b) performing an emulsion polymerization in an aqueous medium comprising one or more surfactants selected from the group consisting of anionic surfactants and nonionic surfactants, using an initiator and optional reducing component at a level of from 0.001 to 5% each based on the weight of monomer in the presence of said dispersed pigment particle to provide a second polymer that at least partially encapsulates said dispersed pigment particle.

2. The process of claim 1 in which said pigment particle comprises titanium dioxide.

3. The process of claim 1 in which said aminophosphorus acid-functional water soluble polymer is selected from the group consisting of a block copolymer having a single block comprising amine and phosphorous acid groups and a comb graft polymer having a backbone comprising amine and phosphorus acid groups with teeth which do not comprise amine and phosphorus acid groups.

* * * * *